(12) United States Patent
Shin et al.

(10) Patent No.: US 11,710,852 B2
(45) Date of Patent: Jul. 25, 2023

(54) SEPARATOR FOR SECONDARY BATTERY AND LITHIUM SECONDARY BATTERY INCLUDING SAME

(71) Applicant: LG CHEM, LTD., Seoul (KR)

(72) Inventors: Won Kyung Shin, Daejeon (KR); Kyoung Ho Ahn, Daejeon (KR); Chul Haeng Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 295 days.

(21) Appl. No.: 16/769,694

(22) PCT Filed: Feb. 1, 2019

(86) PCT No.: PCT/KR2019/001477
§ 371 (c)(1),
(2) Date: Jun. 4, 2020

(87) PCT Pub. No.: WO2019/156460
PCT Pub. Date: Aug. 15, 2019

(65) Prior Publication Data
US 2020/0373615 A1    Nov. 26, 2020

(30) Foreign Application Priority Data
Feb. 9, 2018  (KR) .................. 10-2018-0016527

(51) Int. Cl.
| | | |
|---|---|---|
| H01M 10/0565 | (2010.01) | |
| H01M 10/0525 | (2010.01) | |
| H01M 50/434 | (2021.01) | |
| H01M 50/431 | (2021.01) | |
| H01M 50/497 | (2021.01) | |

(52) U.S. Cl.
CPC ... *H01M 10/0565* (2013.01); *H01M 10/0525* (2013.01); *H01M 50/431* (2021.01); *H01M 50/434* (2021.01); *H01M 50/497* (2021.01); *H01M 2300/0082* (2013.01)

(58) Field of Classification Search
CPC ........ H01M 4/622; H01M 4/13; H01M 4/621; H01M 4/623; H01M 2004/023; H01M 10/0525; H01M 10/0562; H01M 10/0564; H01M 10/0565
See application file for complete search history.

(56) References Cited

U.S. PATENT DOCUMENTS

| | | |
|---|---|---|
| 6,511,774 B1 | 1/2003 | Tsukuda et al. |
| 10,243,239 B1 | 3/2019 | Ahn et al. |
| 2002/0127467 A1 | 9/2002 | Watanabe et al. |
| 2004/0076885 A1 | 4/2004 | Sato et al. |
| 2004/0146786 A1 | 7/2004 | Sato et al. |
| 2013/0084494 A1* | 4/2013 | Furutani ............. H01M 50/446 429/211 |
| 2014/0220452 A1 | 8/2014 | Yu et al. |
| 2016/0164081 A1* | 6/2016 | Cui ........................ H01M 4/625 427/58 |
| 2018/0166743 A1* | 6/2018 | Lee ........................ H01M 4/624 |
| 2018/0212219 A1* | 7/2018 | Kim .................... H01M 50/449 |
| 2018/0248191 A1* | 8/2018 | Liu .................. C08F 220/1804 |
| 2018/0261816 A1* | 9/2018 | Himstedt ............ H01M 50/431 |
| 2018/0315551 A1* | 11/2018 | Igawa ................. H01M 50/489 |
| 2018/0337426 A1 | 11/2018 | Matsumoto et al. |
| 2019/0148764 A1 | 5/2019 | Seok et al. |

FOREIGN PATENT DOCUMENTS

| | | |
|---|---|---|
| CN | 105593431 A | 5/2016 |
| CN | 106797048 A | 5/2017 |
| JP | H02-170346 A | 7/1990 |
| JP | H11-219727 A | 8/1999 |
| JP | H11-260336 A | 9/1999 |
| JP | 2003-092149 A | 3/2003 |
| JP | 4491075 B2 | 6/2010 |
| JP | 2010-251078 A | 11/2010 |
| JP | 2011-090952 A | 5/2011 |
| JP | 2011-090957 A | 5/2011 |
| JP | 2015-524601 A | 8/2015 |
| JP | 2016-164877 A | 9/2016 |
| JP | 6135399 B2 | 5/2017 |
| JP | 6562839 B2 | 8/2019 |
| KR | 10-2006-0042326 A | 5/2006 |
| KR | 10-0858795 B1 | 9/2008 |
| KR | 10-2012-0139058 A | 12/2012 |
| KR | 10-1511412 B1 | 4/2015 |
| KR | 10-2017-0103049 A | 9/2017 |

(Continued)

OTHER PUBLICATIONS

International Search Report (with partial translation) and Written Opinion dated May 14, 2019, issued in corresponding International Patent Application No. PCT/KR2019/001477.

(Continued)

*Primary Examiner* — Jeremiah R Smith

(74) *Attorney, Agent, or Firm* — Morgan, Lewis & Bockius LLP

(57) ABSTRACT

The present invention relates to a solid polymer electrolyte including a porous substrate formed of an inorganic fiber containing an ethylenically unsaturated group, a polymer compound coupled to the inorganic fiber and including a polymer network in which an oligomer containing a (meth) acrylate group is coupled in a three-dimensional structure, and a lithium salt, and to a lithium secondary battery including the same.

14 Claims, No Drawings

(56) References Cited

FOREIGN PATENT DOCUMENTS

KR   10-2017-0140987 A   12/2017
WO      2002/087003 A1   10/2002
WO      2015/053228 A1    4/2015
WO   WO2015/053228    *  4/2015   ............. H01G 11/52

OTHER PUBLICATIONS

Extended European Search Report dated Nov. 5, 2020 issued by the European Patent Office for corresponding European patent application No. 19751780.8.

Shin et al., "Cross-linked Composite Gel Polymer Electrolyte using Mesoporous Methacrylate-Functionalized $SiO_2$ Nanoparticles for Lithium-Ion Polymer Batteries," Scientific Reports, vol. 6, No. 1, May 18, 2016.

* cited by examiner

SEPARATOR FOR SECONDARY BATTERY AND LITHIUM SECONDARY BATTERY INCLUDING SAME

CROSS-REFERENCE TO RELATED APPLICATIONS

This application claims the benefit first 10-2018-0016527, filed on Feb. 9, 2018, in the Korean Intellectual Property Office, the disclosure of which is incorporated herein in its entirety by reference.

TECHNICAL FIELD

The present invention relates to a solid polymer electrolyte and a lithium secondary battery including the same, and more particularly, to a solid polymer electrolyte including a porous substrate formed of an inorganic fiber containing an ethylenically unsaturated group and a lithium secondary battery including the same.

BACKGROUND ART

As technology development and demand for mobile devices have increased, the demand for secondary batteries as an energy source has been rapidly increased. Among such secondary batteries, lithium secondary batteries having high energy density and operating potential, long cycle life, and low self-discharging rate have been commercialized and widely used.

In recent years, in order to overcome the stability problem of a liquid electrolyte, a lithium secondary battery using a solid electrolyte is under the spotlight.

In general, the solid electrolyte includes, as a main component thereof, polymer compounds composed of polyethylene oxide (PEO) series, polyvinyl acetate (PVA), polyethyleneimine (PEI), polyvinylidene fluoride (PVDF) series, polyacrylonitrile (PAN) series, polymethyl methacrylate (PMMA) series, or a copolymer thereof.

Meanwhile, a solid polymer electrolyte composed only of a polymer is significantly low in mechanical properties, so that it is common to use an inorganic material theretogether rather than using the polymer alone. However, the use of the inorganic material may rather interfere with the movement of lithium ions so that the ion conductivity may be reduced, and when the inorganic material and an organic polymer compound are mixed, interfacial resistance is formed so that the performance of a battery may be deteriorated.

(Patent Document 1) Korean Patent Laid-Open Publication No. 10-2012-0139058

DISCLOSURE OF THE INVENTION

Technical Problem

An aspect of the present invention provides a solid polymer electrolyte capable of improving high-temperature safety and mechanical performance while maintaining ion conductivity at a predetermined level or higher by using a porous substrate formed of an inorganic fiber capable of being coupled to a polymer compound, and a lithium secondary battery including the same.

Technical Solution

According to an aspect of the present invention, there is provided a solid polymer electrolyte including a porous substrate formed of an inorganic fiber containing an ethylenically unsaturated group, a polymer compound coupled to the inorganic fiber and including a polymer network in which an oligomer containing a (meth)acrylate group is coupled in a three-dimensional structure, and a lithium salt.

At this time, the ethylenically unsaturated group may be at least one selected from the group consisting of a vinyl group, an acryloxy group and a methacryloxy group.

According to another aspect of the present invention, there is provided a method for preparing a solid polymer electrolyte, the method including preparing a polymer electrolyte composition by dissolving an oligomer containing a (meth)acrylate group and a lithium salt in a solvent, coating a porous substrate formed of an inorganic fiber containing an ethylenically unsaturated group with the polymer electrolyte composition, and drying and then curing the coated porous substrate.

According to yet another aspect of the present invention, there is provided a lithium secondary battery including the solid polymer electrolyte.

Advantageous Effects

A solid polymer electrolyte according to the present invention uses an inorganic material in the form of a fiber form to improve the mobility of lithium ions in the solid polymer electrolyte, and thus may improve ion conductivity.

Also, an inorganic fiber according to the present invention contains an ethylenically unsaturated group, thereby having high coupling force with an organic polymer compound. Therefore, when compared with a case in which an inorganic material and an organic polymer compound are simply mixed and used, the formation of resistance at an interface between the inorganic material and the organic polymer compound is minimized, so that high-temperature safety may be improved and the mechanical properties of a battery may be improved.

BEST MODE FOR CARRYING OUT THE INVENTION

Hereinafter, the present invention will be described in more detail.

It will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular exemplary embodiments only and is not intended to be limiting of the present invention. The terms of a singular form may include plural forms unless the context clearly indicates otherwise.

It will be further understood that the terms "include", "comprise" or "have" when used in this specification, specify the presence of stated features, numbers, steps, elements, or combinations thereof, but do not preclude the presence or addition of one or more other features, numbers, steps, elements, or combinations thereof.

Meanwhile, unless otherwise specified in the present invention, "*" refers to a portion connected between ends of the same or different atoms or chemical formulas.

In the present specification, weight average molecular weight may refer to a conversion value for a standard polystyrene measured by Gel Permeation Chromatography (GPC), and unless otherwise specified, molecular weight may refer to the weight average molecular weight. At this time, the weight average molecular weight may be measured by Gel Permeation Chromatography (GPC). For example, a sample specimen of a predetermined concentration is prepared, and a GPC measurement system Alliance 4 device is stabilized. When the device is stabilized, a standard specimen and the sample specimen are injected into the device to obtain a chromatogram, and weight average molecular weight is calculated according to an analysis method (System: Alliance 4, Column: Ultrahydrogel linear×2, Eluent: 0.1 M $NaNO_3$ pH 7.0 phosphate buffer, Flow rate: 0.1 mL/min, Temp: 40° C., Injection: 100 μm).

<Solid Polymer Electrolyte>

A solid polymer electrolyte according to the present invention includes a porous substrate, a polymer compound, and a lithium salt.

The porous substrate is formed of an inorganic fiber containing an ethylenically unsaturated group.

In the case of a liquid electrolyte which is typically used, there are significant possibilities in that an electrode material is degenerated and an organic solvent is volatilized, and there are safety issues such as heat generation, ignition, and the like due to the temperature rise in a battery itself and the surroundings thereof. Therefore, studies on a solid polymer electrolyte have been conducted recently.

Meanwhile, in the case of a solid polymer electrolyte, the solid polymer electrolyte composed only of a polymer compound is significantly low in mechanical properties, so that it is common to use an inorganic material theretogether. At this time, the solid polymer electrolyte is prepared by dispersing inorganic particles in the polymer compound. However, the inorganic particles have weak coupling force with an organic polymer compound, so that the inorganic particles are agglomerated or detached among themselves.

In addition, when the inorganic particles and an organic compound such as an oligomer which constitutes the polymer compound are physically mixed, the organic compound and the inorganic particles are not completed coupled, so that there may be a space (dead space) in which it is difficult for lithium ions to move between the organic compound and the inorganic particles that are not coupled. Therefore, there have been problems in that ion conductivity is low since the movement of the lithium ions may be hindered, and the performance of a battery is deteriorated since additional interfacial resistance may be generated between the inorganic particles and the organic compound.

In order to overcome such limitations, the present invention uses a porous substrate formed of an inorganic fiber instead of inorganic particles such that the detachment of an inorganic material is prevented and the hindrance of the movement of lithium ions are suppressed, so that ion conductivity may be improved.

In addition, the porous substrate of the present invention which is formed of an inorganic fiber further includes an ethylenically unsaturated group on a surface of the inorganic fiber, and thus, may be directly coupled with an oligomer constituting a polymer compound through a polymerization reaction. Therefore, interfacial resistance that may be generated between the polymer compound and the inorganic material is minimized, so that the performance of a battery may be improved.

The inorganic fiber may include an inorganic material typically used in the art. For example, the inorganic fiber may include at least one element selected from the group consisting of Si, Al, Ti, Zr, Sn, Ce, Mg, Ca, Zn, Y, Pb, Ba, Hf, and Sr, and preferably, may include at least one element selected from the group consisting of Si, Al, Ti, and Zr.

More specifically, examples of the inorganic fiber may include $SiO_2$, $Al_2O_3$, $TiO_2$, $ZrO_2$, $SnO_2$, $CeO_2$, MgO, CaO, ZnO, $Y_2O_3$, $Pb(Zr, Ti)O_3$ (PZT), $Pb_{(1-a1)}La_{a1}Zr_{(1-b1)}Ti_{b1}O_3$ (0≤a1≤1, 0≤b1≤1, PLZT), $Pb(Mg_{1/3}Nb_{2/3})O_3$—$PbTiO_3$ (PMN-PT), $BaTiO_3$, $HfO_2$(hafnia), and $SrTiO_3$, and the inorganic materials listed above are characterized in that the physical properties thereof do not change even at a high temperature of 200° C. or higher. More preferably, the inorganic fiber may include at least one inorganic material selected from the group consisting of $SiO_2$, $Al_2O_3$, $TiO_2$, and $ZrO_2$.

Meanwhile, the diameter of the inorganic fiber may be 0.01 μm to 10 μm, preferably 0.01 μm to 9 μm, more preferably 0.01 μm to 8 μm. When the diameter of the inorganic fiber is in the above range, the thickness of a porous substrate formed of the inorganic fiber may be controlled, so that it is possible to prevent the energy density of a battery from being reduced and improve the mechanical properties of the porous substrate. Meanwhile, the diameter of the inorganic fiber may be measured by observing the inorganic fiber using a device such as Field Emission Scanning Electron Microscope (FE-SEM).

Meanwhile, in order to improve interfacial adhesion between the inorganic fiber and the polymer compound, an ethylenically unsaturated group may be positioned inside or on a surface of the inorganic fiber using a coupling agent containing the ethylenically unsaturated group. At this time, the coupling agent containing the ethylenically unsaturated group may be directly used in the inorganic fiber, or the coupling agent containing the ethylenically unsaturated group may be used after forming the porous substrate with the inorganic fiber.

Specifically, the ethylenically unsaturated group may include at least one selected from the group consisting of a vinyl group, an acryloxy group and a methacryloxy group.

Typically, as the coupling agent containing the ethylenically unsaturated group, a silane-based compound may be used. For example, methacrylyloxypropyltrimethoxysilane, vinyltrimethoxysilane, acrylic oxytrimethoxysilane, methacryloxytrimethoxysilane, and the like may be used. However, the type of the coupling agent is not limited to the compounds listed above.

Meanwhile, the porous substrate formed of the inorganic fiber may be a sheet or a non-woven fabric manufactured by using the inorganic fiber, and serves as the backbone of the solid polymer electrolyte according to the present invention.

For example, the porous substrate may be manufactured by the following method. However, the present invention is not limited to the following manufacturing method.

First, a molten inorganic fiber composition is extruded through a bushing device consisting of thousands of micropores. Thereafter, the extruded inorganic fiber composition is pulled by a winding device and rapidly quenched in the air at the same time to be manufactured as an inorganic fiber having a diameter to be manufactured. The manufactured inorganic fiber is then subjected to a coating process (sizing process), a winding process, and a post-treatment process, and the like, selectively, to be manufactured as a porous substrate in various forms, such as a sheet or a non-woven fabric.

The thickness of the porous substrate may be 1 μm to 200 μm, preferably 5 μm to 200 μm, more preferably 10 μm to 200 μm. When the thickness of the porous substrate is in the above range, the short circuit of a positive electrode and a negative electrode may be suppressed, and the performance of a battery may be improved by maintaining the mobility of lithium ions at a predetermined level or higher.

The porosity of the porous substrate may be 10% to 80%, preferably 15% to 80%, more preferably 10% to 80%. The porosity of the porous substrate is measured using a Gurley value which is an indicator for measuring air permeability. The Gurley value is an index measured based on time taken when air flow (100 cm$^2$) is transmitted through a standard area under uniform pressure. When the porosity is in the above range, the mechanical properties of the solid polymer electrolyte are high and lithium ion conductivity may be improved.

Next, a polymer compound will be described. The polymer compound is coupled to the inorganic fiber and includes a polymer network in which an oligomer containing a (meth)acrylate group is coupled in a three-dimensional structure.

For example, the oligomer may further include an oxyalkylene group. Specifically, the oligomer is represented by Formula 1 below.

A-B-A'  [Formula 1]

In Formula 1, the A and A' are each independently a unit containing a (meth)acrylate group, and the B is a unit containing an oxyalkylene group.

Specifically, the units A and A' are units including a (meth)acrylate group such that an oligomer may be coupled in a three-dimensional structure so as to form a polymer network. The units A and A' may be derived from a monomer including monofunctional or polyfunctional (meth)acrylate or (meth)acrylic acid.

For example, the units A and A' may each independently contain at least one of the units represented by Formula A-1 to Formula A-5 below.

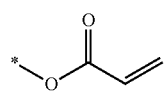

[Formula A-1]

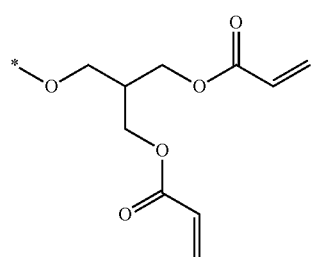

[Formula A-2]

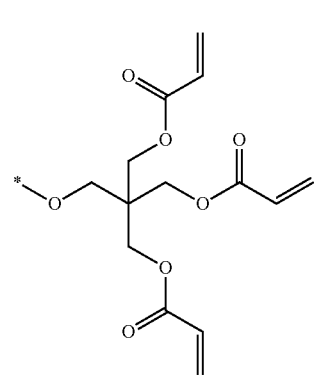

[Formula A-3]

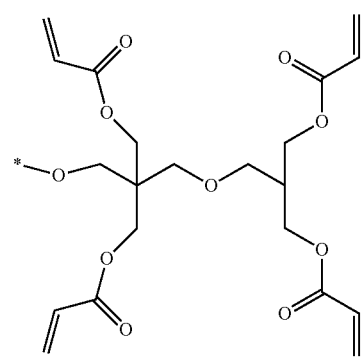

[Formula A-4]

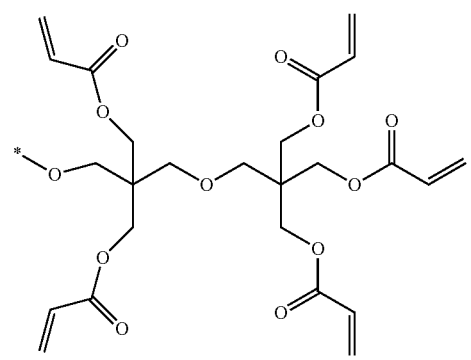

[Formula A-5]

The unit B may include a unit represented by Formula B-1.

$$*\!-\!(\!R\!-\!O\!)_{\!k}\!R'\!-\!*$$  [Formula B-1]

In Formula B-1, R and R' are each independently a substituted or unsubstituted linear-type or branched-type alkylene group having 1 to 10 carbon atoms, and k is an integer of 1 to 30.

In another example, in Formula B-1, the R and R' may each be independently —CH$_2$CH$_2$— or —CHCH$_3$CH$_2$—.

For example, according to one embodiment of the present invention, an oligomer forming a polymer network may be at least one compound selected from the group consisting of Formula 1-1 to Formula 1-5 below.

[Formula 1-1]

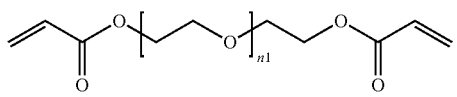

[Formula 1-2]

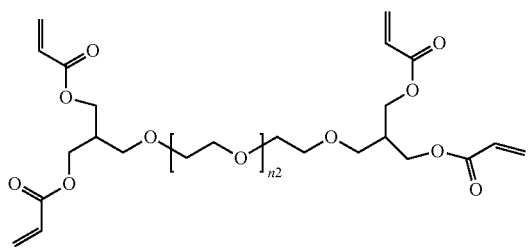

[Formula 1-3]

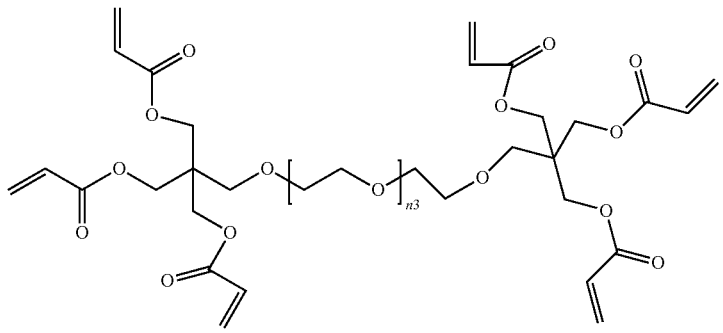

[Formula 1-4]

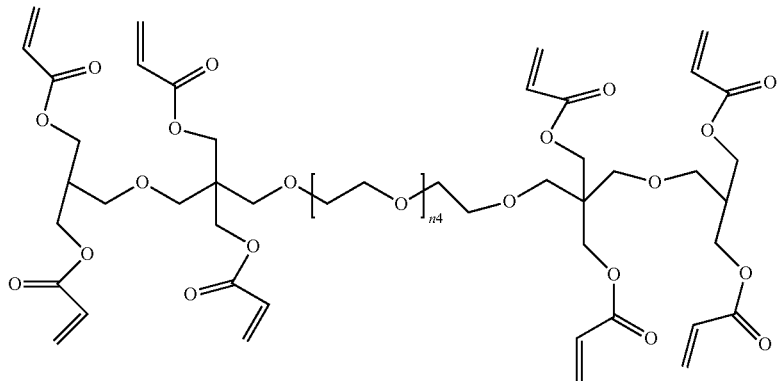

[Formula 1-5]

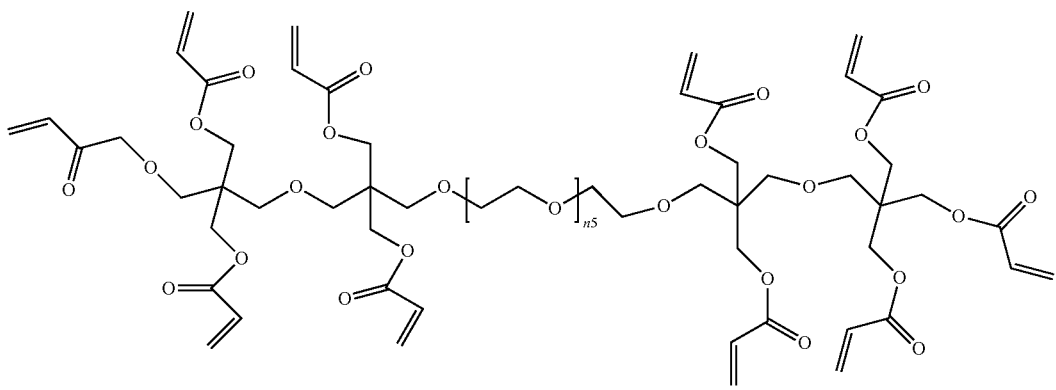

In Formula 1-1 to Formula 1-5, the n1 to n5 are each independently an integer of 1 to 2,000, preferably an integer of 1 to 1,500, and more preferably an integer of 1 to 1,000.

The oligomer according to the present invention may have a weight average molecular weight of about 1,000 to 100,000, preferably 1,000 to 70,000, more preferably 1,000 to 50,000. When the weight average molecular weight of the oligomer is in the above range, the mechanical properties of a solid polymer electrolyte including a polymer network formed of the oligomer is improved, and the lithium ion conductivity may also be improved.

<Preparation Method of Solid Polymer Electrolyte>

Next, a method for preparing the solid polymer electrolyte according to the present invention will be described. The preparation method includes (1) preparing a polymer electrolyte composition, (2) coating a porous substrate with the polymer electrolyte composition, and (3) curing the coated porous substrate.

(1) Preparation of Polymer Electrolyte Composition

A polymer electrolyte composition may be prepared by mixing the oligomer containing a (meth)acrylate group and a lithium salt with a solvent, a polymerization initiator, and the like.

At this time, the oligomer may be included in an amount of 60 parts by weight to 95 parts by weight, more preferably 65 parts by weight to 95 parts by weight, based on 100 parts by weight of a solid excluding the solvent from the polymer electrolyte composition. When the oligomer is included in the above range, the mechanical properties of the solid polymer electrolyte may be improved, and the lithium ion transfer properties may be maintained at a predetermined level or higher. Other descriptions of the oligomer are the same as those described above, and thus will be omitted.

Any lithium salt may be used without particular limitation as long as it is typically used in an electrolyte for a lithium secondary battery. For example, the lithium salt may include $Li^+$ as positive ions, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, and $(CF_3CF_2SO_2)_2N^-$ as negative ions. The lithium salt may include a single material or a mixture of two or more materials, when needed. The content of the lithium salt may be appropriately changed within a range that is typically usable.

The solvent is not particularly limited, and tetrahydrofuran (THF), acetonitrile, N-methyl-2-pyrrolidone (NMP), acetone, and the like may be used.

The polymerization initiator may be any typical polymerization initiator known in the art, and may be at least one selected from the group consisting of an azo-based compound, a peroxide-based compound, or a mixture thereof.

For example, the polymerization initiator may be an organic peroxide or a hydroperoxide such as benzoyl peroxide, acetyl peroxide, dilauryl peroxide, di-tert-butyl peroxide, t-butyl peroxy-2-ethyl-hexanoate, cumyl hydroperoxide, and hydrogen peroxide, or at least one azo compound selected from the group consisting of 2,2'-azobis (2-cyanobutane), dimethyl 2,2'-azobis (2-methylpropionate), 2,2'-azobis (methylbutyronitrile), 2,2'-azobis (isobutyronitrile) (AIBN), and 2,2'-azobisdimethyl-valeronitrile (AMVN), but is not limited thereto.

The polymerization initiator may be included in an amount of 0.01 parts by weight to 10 parts by weight, more preferably 0.01 parts by weight to 5 parts by weight, based on 100 parts by weight of the oligomer. When the polymerization initiator is included in the above range, the molecular weight of the polymer compound may be controlled to maintain the mechanical shape of the solid polymer electrolyte constant.

(2) Coating of Porous Substrate

Next, the step of coating a porous substrate will be described.

First, an inorganic fiber constituting a porous substrate is treated with a coupling agent containing an ethylenically unsaturated group such that the inorganic fiber contains the ethylenically unsaturated group. More specifically, a porous substrate formed of an inorganic fiber is immersed in a solution in which a coupling agent substituted with an ethylenically unsaturated group is dissolved to couple the inorganic fiber constituting the porous substrate with the coupling agent. When the coupling agent is coupled, using the coupling agent as a medium, the inorganic fiber and the ethylenically unsaturated group contained in the coupling agent are connected, so that the ethylenically unsaturated group may be positioned inside or on a surface of the porous substrate.

Thereafter, the porous substrate formed of the inorganic fiber containing the ethylenically unsaturated group is coated with the polymer electrolyte composition.

The coating method is not limited to a particular method, and any known coating method such as impregnation, slot die, gravure coating, spin coating, spray coating, roll coating, curtain coating, extrusion, casting, screen printing, or inkjet printing may be used.

As the porous substrate goes through the step of coating the polymer electrolyte composition, the ethylenically unsaturated group positioned inside or on the surface of the porous substrate reacts with the oligomer, and thus, the porous substrate and the oligomer are coupled. The porous substrate, the polymer electrolyte composition and the coupling agent are the same as those described above, and thus the descriptions thereof will be omitted.

(3) Curing of Coated Porous Substrate

Lastly, the step of drying and then curing the coated porous substrate will be described.

Even when a porous substrate is coated with a polymer electrolyte composition, an oligomer included in the polymer electrolyte composition and an inorganic fiber constituting the porous substrate cannot be coupled in that state alone. Therefore, a curing step should be performed such that an ethylenically unsaturated group contained in the inorganic fiber and a (meth)acrylate group contained in the oligomer are coupled through a radical polymerization reaction and then through a crosslinking reaction.

The curing step may be performed while forming a network of a three-dimensional structures between the oligomer and the inorganic fibers through a crosslinking reaction between oligomers and through a crosslinking reaction between the oligomer and the inorganic fiber both by UV irradiation E-BEAM, gamma ray, a room temperature/high-temperature aging process, and the like.

<Lithium Secondary Battery>

Next, a lithium secondary battery according to the present invention will be described. The lithium secondary battery according to yet another embodiment of the present invention includes a positive electrode, a negative electrode, and the solid polymer electrolyte. Specifically, the solid polymer electrolyte may be prepared by being coated on an electrode or a porous separator and introduced, or may be inserted between a positive electrode and a negative electrode in a free standing form. The free standing solid polymer electrolyte is not formed in a solid form by coating a solid polymer constituting an electrolyte on an electrode or a porous separator and curing the solid polymer, but is a solid polymer electrolyte present in the form of a film by being cured through a crosslinking reaction before being interposed in a battery.

The positive electrode may be prepared by coating a positive electrode active material slurry including a positive electrode active material, a binder, a conductive agent, and a solvent on a positive electrode current collector.

The positive electrode current collector typically has a thickness of 3 μm to 500 μm, and is not particularly limited as long as it has conductivity without causing a chemical change in the battery. For example, stainless steel, aluminum, nickel, titanium, fired carbon, or aluminum or stainless steel that is surface-treated with one of carbon, nickel, titanium, silver, and the like may be used.

The positive electrode active material is a compound capable of reversible intercalation and de-intercalation of lithium, and specifically, may include a lithium composite metal oxide containing one or more metals such as cobalt, manganese, nickel or aluminum, and lithium. More specifically, the lithium composite metal oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y1}Mn_{Y1}O_2$ (wherein 0<Y1<1), $LiMn_{2-Z1}Ni_{Z1}O_4$ (wherein 0<Z1<2) etc.), a lithium-nickel-cobalt-based oxide (e.g., $LiNi_{1-Y2}Co_{Y2}O_2$ (wherein 0<Y2<1), etc.), a lithium-manganese-cobalt-based oxide (e.g., $LiCo_{1-Y3}Mn_{Y3}O_2$ (wherein 0<Y3<1), $LiMn_{2-Z2}Co_{Z2}O_4$ (wherein 0<Z2<2), etc.), a lithium-nickel-manganese-cobalt-based oxide (e.g., $Li(Ni_{p1}Co_{q1}Mn_{r1})O_2$ (wherein 0<p1<1, 0<q1<1, 0<r1<1, p1+q1+r1=1) or $Li(Ni_{p2}Co_{q2}Mn_{r2})O_4$ (wherein 0<p2<2, 0<q2<2, 0<r2<2, p2+q2+r2=2), etc.), or a lithium-nickel-cobalt-transition metal (M) oxide (e.g., $Li(Ni_{p3}Co_{q3}Mn_{r3}M_{s1})O_2$ (wherein M is selected from the group consisting of Al, Fe, V, Cr, Ti, Ta, Mg, and Mo, and p3, q3, r3, and s1 are each an atomic fraction of independent elements, wherein 0<p3<1, 0<q3<1, 0<r3<1, 0<s1<1, p3+q3+r3+s1=1) and the like, and any one thereof or a compound of two or more thereof may be included.

Among these, due to the fact that the capacity and stability of a battery may be increased, the lithium composite metal oxide may be $LiCoO_2$, $LiMnO_2$, $LiNiO_2$, a lithium nickel-manganese-cobalt oxide (e.g., $Li(Ni_{0.6}Mn_{0.2}Co_{0.2})O_2$, $Li(Ni_{0.5}Mn_{0.3}CO_{0.2})O_2$, or $Li(Ni_{0.8}Mn_{0.1}Co_{0.1})O_2$, etc.), or a lithium nickel cobalt aluminum oxide (e.g., $LiNi_{0.8}CO_{0.15}Al_{0.05}O_2$, etc.). When considering the effect of remarkable improvement according to the type and content ratio control of constituent elements forming a lithium composite metal oxide, the lithium composite metal oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and the like, and any one thereof or a mixture of two or more thereof may be used.

The positive electrode active material may be included in an amount of 60 wt % to 98 wt %, preferably 70 wt % to 98 wt %, more preferably 80 wt % to 98 wt % based on the total weight of a solid excluding the solvent from the positive electrode active material slurry.

The binder is a component for assisting in coupling between an active material and a conductive agent, and coupling to a current collector. Specifically, examples of the binder may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene (PE), polypropylene, an ethylene-propylene-diene monomer (EPDM), a sulfonated EPDM, styrene-butadiene rubber, nitrile-butadiene rubber, fluorine rubber, various copolymers thereof, and the like. Typically, the binder may be included in an amount of 1 wt % to 20 wt %, preferably 1 wt % to 15 wt %, more preferably 1 wt % to 10 wt % based on the total weight of a solid excluding the solvent from the positive electrode active material slurry.

The conductive agent is a component for further improving the conductivity of a positive electrode active material. The conductive agent is not particularly limited as long as it has conductivity without causing a chemical change in the battery. Examples of the conductive agent may include graphite; a carbon-based material such as carbon black, acetylene black, Ketjen black, channel black, furnace black, lamp black, and thermal black; a conductive fiber such as carbon fiber and metal fiber; metal powder such as fluorocarbon powder, aluminum powder, and nickel powder; a conductive whisker such as zinc oxide and potassium titanate; a conductive metal oxide such as titanium oxide; or a conductive material such as a polyphenylene derivative, and the like. Specific examples of a commercially available conductive material may include acetylene black series of Chevron Chemical Company, Denka Black of Denka Singapore Private Limited, Gulf Oil Company, etc., Ketjen black and EC series of Armak Company, Vulcan XC-72 of Cabot Company, and Super P of Timcal Company. The conductive agent may be included in an amount of 1 wt % to 20 wt %, preferably 1 wt % to 15 wt %, more preferably 1 wt % to 10 wt % based on the total weight of a solid excluding the solvent from the positive electrode active material slurry.

The solvent may include an organic solvent such as N-methyl-2-pyrrolidone (NMP), and may be used in an amount such that a preferred viscosity is achieved when the positive electrode active material, and selectively, the binder and the conductive agent, and the like are included. For example, the solvent may be included in an amount such that the concentration of a solid including the positive electrode active material, and selectively the binder and the conductive agent is 50 wt % to 95 wt %, preferably 70 wt % to 95 wt %, more preferably 70 wt % to 90 wt %.

Also, the negative electrode may be prepared by coating a negative electrode active material slurry including a negative electrode active material, a binder, a conductive agent, and a solvent on a negative electrode current collector.

The negative electrode current collector typically has a thickness of 3 μm to 500 μm. The negative electrode current collector is not particularly limited as long as it has high conductivity without causing a chemical change in the battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, as in the case of the positive electrode current collector, microscopic irregularities may be formed on the surface of the negative electrode current collector to improve the coupling force of a negative electrode active material, and the negative electrode current collector may be used in various forms of such as a film, a sheet, a foil, a net, a porous body, a foam body, and a non-woven fabric body.

Examples of the negative electrode active material may include one or two or more kinds of negative electrode active materials selected from the group consisting of natural graphite, artificial graphite, a carbonaceous material; a metal (Me) such as a lithium-containing titanium composite oxide (LTO), Si, Sn, Li, Zn, Mg, Cd, Ce, Ni or Fe; an alloy composed of the metals (Me); an oxide (Meox) of the metal (Me); and a composite of the metal (Me) and carbon.

The negative electrode active material may be included in an amount of 60 wt % to 98 wt %, preferably 70 wt % to 98 wt %, more preferably 80 wt % to 98 wt % based on the total weight of a solid excluding the solvent from the negative electrode active material slurry.

The descriptions of the binder, conductive agent, and solvent are the same as those described above, and thus, detailed descriptions thereof will be omitted.

According to another embodiment of the present invention, a battery module including the lithium secondary battery as a unit cell and a battery pack including the same are provided. The battery module and the battery pack include the lithium secondary battery having high capacity, high rate properties, and cycle properties, and thus may be used as a power source of a medium-and-large sized device selected from the group consisting of an electric vehicle, a hybrid electric vehicle, a plug-in hybrid electric vehicle, and a power storage system.

MODE FOR CARRYING OUT THE INVENTION

Hereinafter, the present invention will be described in more detail with reference to specific examples. However, the following examples are merely illustrative of the present invention and are not intended to limit the scope of the present invention. It will be apparent to those skilled in the art that various changes and modifications can be made without departing from the scope and spirit of the invention, and it is obvious that such variations and modifications are within the scope of the appended claims.

EXAMPLES

Example 1: Preparation of Solid Polymer Electrolyte (1) Preparation of Porous Substrate Containing Ethylenically Unsaturated Group A porous substrate (GE Healthcare Life Sciences Co., Whatman, thickness=90 μm) formed of $SiO_2$, and of an inorganic fiber having a diameter of 1.6 μm was immersed in a coating solution in which a methacryloxypropyltrimethoxysilane coupling agent is added to an ethanol solvent, and then dried to prepare a porous substrate including an inorganic fiber containing a methacryloxy group.

(2) Preparation of Solid Polymer Electrolyte 90 g of an oligomer (n1:3) represented by Formula 1-1, 10 g of a lithium salt (LiTFSI), 0.18 g of benzoyl peroxide as a polymerization initiator were added to acetone to prepare a polymer electrolyte composition.

Thereafter, the polymer electrolyte composition was coated on the porous substrate, dried at 40° C., and then irradiated with UV to prepare a solid polymer electrolyte having a thickness of 100 μm.

(3) Manufacturing of Lithium Secondary Battery 94 wt % of $Li(Ni_{0.8}Mn_{0.1}Co_{0.1})O_2$ as a positive electrode active material, 3 wt % of carbon black as a conductive agent, and 3 wt % of polyvinylidene fluoride (PVDF) as a binder were added to N-methyl-2-pyrrolidone(NMP) as a solvent to prepare a positive electrode active material slurry. The positive electrode active material slurry was applied to an aluminum (Al) thin film having a thickness of about 20 μm, which is a positive electrode current collector, dried and then roll pressed to manufacture a positive electrode.

96 wt % of carbon powder as a negative electrode active material, 3 wt % of PVDF as a binder, and 1 wt % of carbon black as a conductive agent were added to NMP as a solvent to prepare a negative electrode active material slurry. The negative electrode active material was applied to a copper (Cu) thin film having a thickness of about 10 μm, which is a negative electrode current collector, dried and then roll pressed to manufacture a negative electrode.

The positive electrode, the negative electrode, and the solid polymer electrolyte between the positive electrode and the negative electrode were sequentially laminated, and then placed inside a pouch to manufacture a lithium secondary battery.

Example 2

A solid polymer electrolyte and a lithium secondary battery were manufactured in the same manner as in Example 1 except that a porous substrate was prepared by using vinyltrimethoxysilane instead of methacryloxypropyltrimethoxysilane as the coupling agent such that an inorganic fiber contains a vinyl group.

COMPARATIVE EXAMPLE

Comparative Example 1

A solid polymer electrolyte and a lithium secondary battery were manufactured in the same manner as in Example 1 except that a porous substrate was not coated with a coating solution to which a coupling agent is added.

Comparative Example 2

(1) Preparation of Electrolyte

An electrolyte was prepared by adding 1 M of a lithium salt ($LiPF_6$) to a solution in which ethylene carbonate and ethylmethylcarbonate are mixed in a volume ratio of 3:7.

(2) Manufacturing of Lithium Secondary Battery

A positive electrode and a negative electrode were manufactured in the same manner as in Example 1, and then a polyethylene separator was interposed between the positive electrode and the negative electrode and placed inside a pouch. Thereafter, 300 μm of the electrolyte prepared in step (1) was injected thereto to prepare a lithium secondary battery.

EXPERIMENTAL EXAMPLES

Experimental Example 1: Measurement of Ion Conductivity

The ion conductivity of each solid polymer electrolyte according to Examples 1 and 2, and Comparative Example 1 were measured and the results are shown in Table 1. Specifically, the solid polymer electrolyte was placed between stainless steel electrodes, and then the ion conductivity (δ) was measured using the VMP3 measurement device and 4294 by an alternating current impedance measurement method in the frequency band of 100 MHz to 0.1 Hz. (δ=1/(R*A), δ is ion conductivity (mS/cm), 1 is electrolyte thickness (cm), R is measured resistance (mS), A is the area of the electrolyte ($cm^2$))

TABLE 1

|  | Ion conductivity (mS/cm) |
| --- | --- |
| Example 1 | 0.85 |
| Example 2 | 0.74 |
| Comparative Example 1 | 0.12 |

As shown in Table 1, the ion conductivity of Examples 1 and 2 are remarkably excellent compared with that of Comparative Example 1. This is because the lithium ion transfer properties in the electrolyte of Examples 1 and 2 was further improved than those of Comparative Example 1.

Experimental Example 2: Checking Degree of Coupling Between Porous Substrate and Oligomer During the preparation of each of the solid polymer electrolytes according to Examples 1 and 2, the porous substrate was coated with a polymer electrolyte composition and then only dried at 40° C. At this time, the coupling force between the oligomer and the porous substrate was measured before and after a UV irradiation reaction. Specifically, a value obtained by dividing an integrated area below a peak (1640 cm$^{-1}$) at which a carbon-carbon double bond (—C=C—) in FT-IR may be confirmed by an integrated area below a peak (1050 cm$^{-1}$) at which a siloxane functional group (—Si—O—) contained in the coupling agent may be confirmed are shown in Table 2, respectively. At this time, the siloxane functional group (—Si—O—) contained in the coupling agent does not react with the oligomer, and thus, there is no change in the integrated area below the peak before and after the UV irradiation reaction. Therefore, the degree of reaction may be confirmed on the basis thereof.

TABLE 2

| | Ratio of peak 1650 cm$^{-1}$ integrated area/peak 1050 cm$^{-1}$ integrated area before the UV reaction | Ratio of peak 1650 cm$^{-1}$ integrated area/peak 1050 cm$^{-1}$ integrated area after the UV reaction |
|---|---|---|
| Example 1 | 0.75 | 0.01 |
| Example 2 | 0.67 | 0.02 |

Referring to Table 2, before and after the UV irradiation reaction, the ratio of the integrated area below a 1640 cm$^{-1}$ peak to the integrated area below a 1050 cm$^{-1}$ peak of Examples 1 and 2 is significantly reduced. This is because the double bond positioned on the surface of the porous substrate is coupled to the oligomer and is hardly measured.

Experimental Example 3: Measurement of Initial Capacity

The lithium secondary batteries manufactured in Examples 1 and 2 and the lithium secondary batteries manufactured in Comparative Examples 1 and 2 were respectively subjected to a formation process at a current (0.05 C rate) of 6.5 mA. Thereafter, 4.2 V, 13 mA (0.1 C, 0.05 C cut-off) CC/CV charge and 3 V, 13 mA (0.1 C) CC discharge were repeated three times, and the third discharge capacity was defined as the initial capacity. The results are shown in Table 3.

TABLE 3

| | Initial capacity (mAh) |
|---|---|
| Example 1 | 128 |
| Example 2 | 126 |
| Comparative Example 1 | 97 |
| Comparative Example 2 | 130 |

Referring to Table 3, the lithium secondary batteries of Example 1 and 2 is formed with a stable solid electrolyte, thereby exhibiting a higher initial capacity than the lithium secondary battery of Comparative Example 1, and a similar initial capacity to that of a lithium secondary battery of Comparative Example 2 to which the liquid electrolyte is applied.

Meanwhile, as shown in Table 2, the lithium secondary battery of Comparative Example 1 has a lower lithium ion conductivity than the lithium secondary batteries of Examples 1 and 2, so that it can be seen that the initial capacity thereof is relatively low.

Experimental Example 4: Nail Penetration Test

When each of the fully-charged lithium secondary batteries manufactured in Examples 1 and 2 and Comparative Examples 1 and 2 was penetrated with a metal nail having a diameter of 2.5 mm at a rate of 600 mm/minute, a heat generation temperature and an ignition state of the battery were measured to perform a safety evaluation test of the secondary battery. The measurement results are shown in Table 4. An internal short circuit of the lithium secondary battery occurs due to the penetration of the metal nail, causing the battery to be heated. The higher the heat generation temperature, the higher the likelihood of ignition, so that the safety is evaluated to be low. Also, when such heat generation leads to ignition, the safety of the secondary battery is evaluated to be very low.

TABLE 4

| | Heat generation temperature (° C.) | Ignition or no ignition |
|---|---|---|
| Example 1 | 40 | X |
| Example 2 | 40 | X |
| Comparative Example 1 | 70 | X |
| Comparative Example 2 | 180 | ○ |

As shown in Table 4, the secondary battery of Example and 2 of the present invention has a heat generation temperature of 40° C., which is relatively low, thereby having an excellent safety. However, the secondary battery of Comparative Example 1, although not ignited, has a higher heat generation temperature, and thus has a lower safety than the lithium secondary battery according to Examples. It can be confirmed that the secondary battery of Comparative Example 2 has a higher heat generation temperature and even ignites.

Experimental Example 5: Battery Swelling Test and High-Temperature Storage Test

The thickness of each of the fully-charged lithium secondary batteries manufactured in Examples 1 and 2 and Comparative Examples 1 and 2 was measured, and then after leaving the secondary batteries unattended for 24 hours at 120° C., the thickness of the lithium secondary batteries was measured again. At this time, by comparing the measured thickness before/after leaving the batteries unattended, the swelling of the batteries was measured, and the results are shown in Table 5.

TABLE 5

| | Battery thickness change rate (%) |
|---|---|
| Example 1 | >1 |
| Example 2 | >1 |
| Comparative Example 1 | >1 |
| Comparative Example 2 | 120 |

As shown in Table 5, in the case of Comparative Example 2 in which a liquid electrolyte was used, the thickness change rate of the battery was significantly increased. This is because the liquid electrolyte is easily volatilized at a high temperature and causes an oxidation reaction at an interface of an electrode which generates a large amount of gas. On the other hand, in the case of Example 1 and Example 2, a solid polymer electrolyte is used so that even when the battery is stored or left unattended at a high temperature, gas is not generated, and the swelling of the battery does not occur. Therefore, it can be confirmed that there is little change in the battery thickness.

The invention claimed is:

1. A solid polymer electrolyte comprising:
a porous substrate comprising an inorganic fiber containing an ethylenically unsaturated group;
a polymer compound coupled to the inorganic fiber and including a polymer network in which an oligomer containing a (meth)acrylate group is coupled in a three-dimensional structure; and
a lithium salt,
wherein the oligomer comprises at least one of the compounds represented by Formula 1-2 and 1-4:

[Formula 1-2]

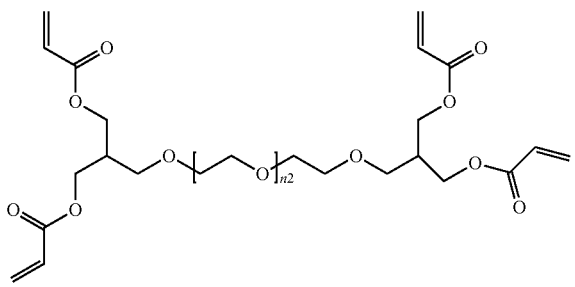

wherein in Formula 1-2, n2 is 1 to 2,000,

[Formula 1-4]

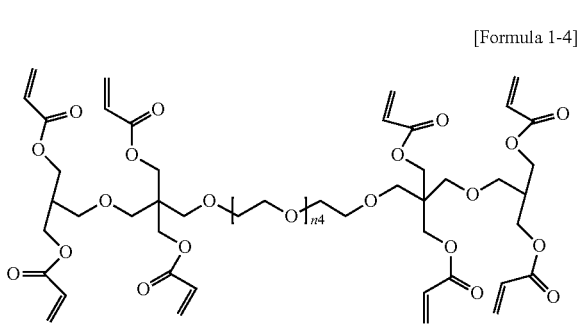

wherein in Formula 1-4, n4 is 1 to 2,000.

2. The solid polymer electrolyte of claim 1, wherein the ethylenically unsaturated group comprises at least one selected from the group consisting of a vinyl group, an acryloxy group and a methacryloxy group.

3. The solid polymer electrolyte of claim 1, wherein the oligomer further contains an oxyalkylene group.

4. The solid polymer electrolyte of claim 1, wherein the inorganic fiber has a diameter of 0.01 μm to 10 μm.

5. The solid polymer electrolyte of claim 1, wherein the porous substrate has a thickness of 1 μm to 200 μm.

6. The solid polymer electrolyte of claim 1, wherein the porous substrate has a porosity of 10% to 80%.

7. The solid polymer electrolyte of claim 1, wherein the inorganic fiber contains the ethylenically unsaturated group on a surface of the inorganic fiber.

8. The solid polymer electrolyte of claim 1, wherein the inorganic fiber has a diameter of 0.01 μm to 10 μm.

9. The solid polymer electrolyte of claim 1, wherein the inorganic fiber has a diameter of 0.01 μm to 8 μm.

10. The solid polymer electrolyte of claim 1, wherein the oligomer comprises a compound represented by Formula 1-2:

[Formula 1-2]

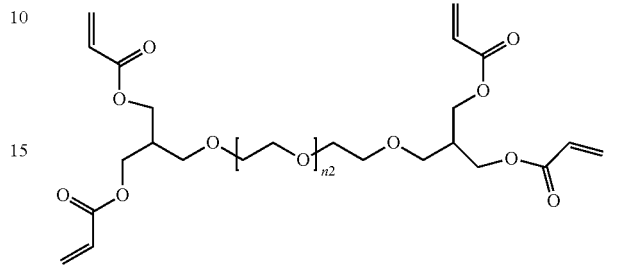

wherein in Formula 1-2, n2 is 1 to 2,000.

11. The solid polymer electrolyte of claim 1, wherein the oligomer comprises a compound represented by Formula 1-3:

[Formula 1-3]

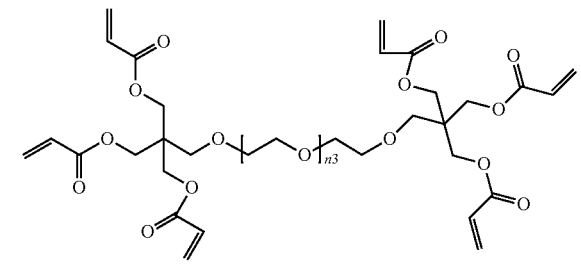

wherein in Formula 1-3, n3 is 1 to 2,000.

12. The solid polymer electrolyte of claim 1, wherein the oligomer comprises a compound represented by Formula 1-4:

[Formula 1-4]

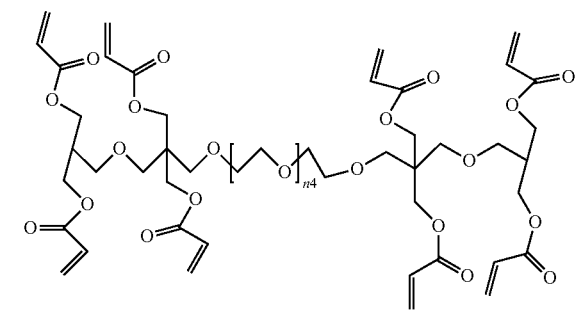

wherein in Formula 1-4, n4 is 1 to 2,000.

13. The solid polymer electrolyte of claim 1, wherein the oligomer comprises a compound represented by Formula 1-5:

[Formula 1-5]
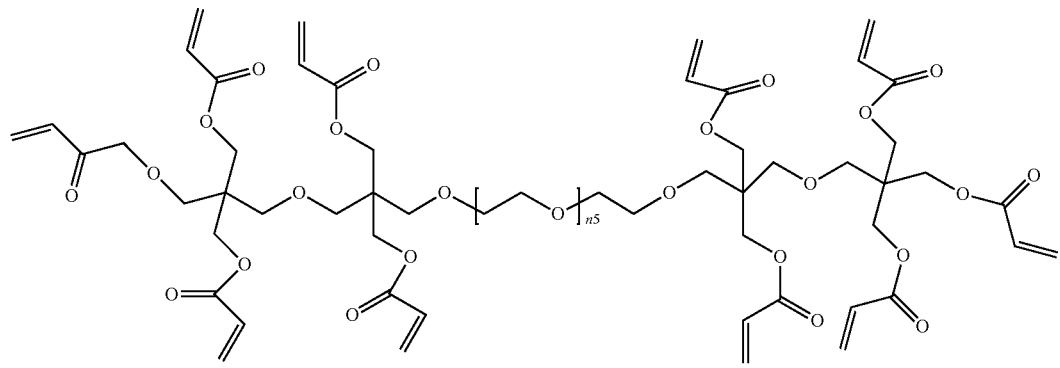
wherein in Formula 1-5, n5 is 1 to 2,000.
14. A lithium secondary battery comprising the solid polymer electrolyte according to claim 1.
* * * * *